Oct. 21, 1947.  O. R. SCHULER  2,429,491
APPARATUS FOR FORMING ANNULAR FINS ON TUBING
Filed Oct. 2, 1944  4 Sheets-Sheet 1

INVENTOR.
OTTO R. SCHULER
BY
Whittemore Hulbert Belknap
ATTORNEYS

Oct. 21, 1947.   O. R. SCHULER   2,429,491
APPARATUS FOR FORMING ANNULAR FINS ON TUBING
Filed Oct. 2, 1944   4 Sheets-Sheet 2
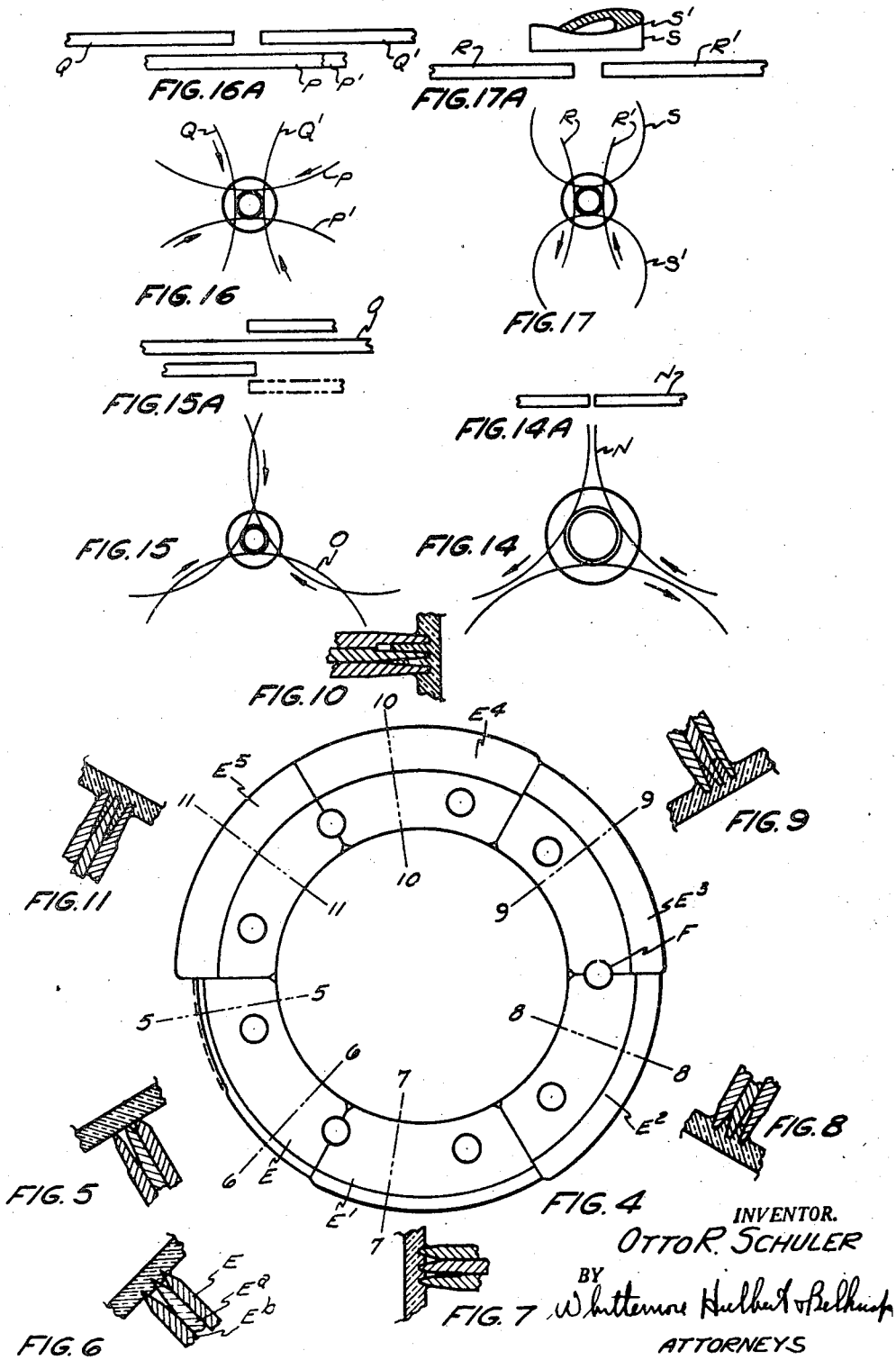

Patented Oct. 21, 1947

2,429,491

UNITED STATES PATENT OFFICE 2,429,491

APPARATUS FOR FORMING ANNULAR FINS ON TUBING

Otto R. Schuler, Detroit, Mich., assignor to Calumet and Hecla Consolidated Copper Company, Calumet, Mich., a corporation of Michigan Application October 2, 1944, Serial No. 556,788

2 Claims. (Cl. 80—58)

The invention relates to the manufacture of integral finned tubing of that type in which the outer surface portion of a plain tube is axially displaced to form extruded fins.

It is the object of the invention to manufacture finned tubing of this general character but which specifically has fins of annular form spaced and separate from adjacent fins. This differs from the usual construction in which the fins are helical and continuous with each other and cannot be formed by the same method and apparatus used for the latter. The method which I employ forms the subject matter of a copending application for patent and the instant invention consists in the peculiar construction of the apparatus.

The essential feature of my improved apparatus is a rotary tool having a helical flange of progressively changing cross section which is arranged in intersecting rolling contact with the peripheral portion of the tubing to be finned. The center to center distance between successive convolutions of this helical flange corresponds to the center to center spacing of the annular fins to be formed on the tubing so that in the operation of the machine the tubing will be axially advanced and the annular fins successively formed thereon. This construction differs from apparatus previously used in which tools are formed of a series of spaced circular discs successively of different cross sections.

By reason of this change in the character of my tool, difficulties arise in the manufacture of the same. In the former construction each of the discs is of a constant cross section so that it can be easily formed on a lathe or similar tool. On the other hand, a spiral flange of progressively changing cross section is difficult to be formed in this manner. I have solved the difficulty by forming my improved apparatus as hereinafter set forth.

In the drawings:

Fig. 4 is a transverse section through a forming roll of modified construction;

Figs. 5, 6, 7, 8, 9, 10 and 11 are cross sections on lines in Fig. 4 having corresponding numbers;

Figs. 14, 15, 16 and 17 are diagrams illustrating various arrangements of the forming tools with respect to the work; and Figs. 14A, 15A, 16A and 17A are corresponding plan views thereof.

Figure 1:
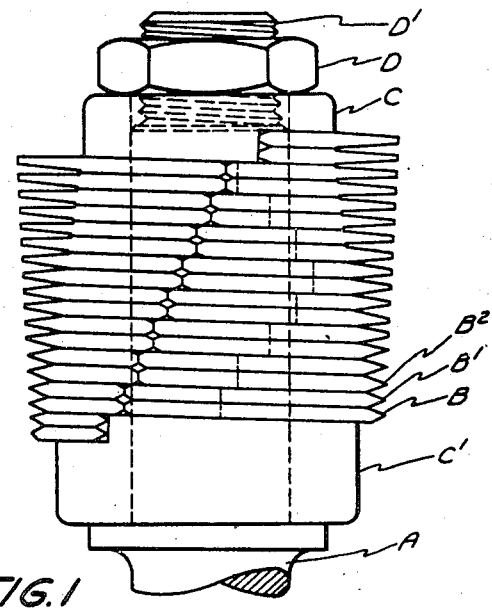
Fig. 1 is a plan view of a forming tool.
Figure 2:
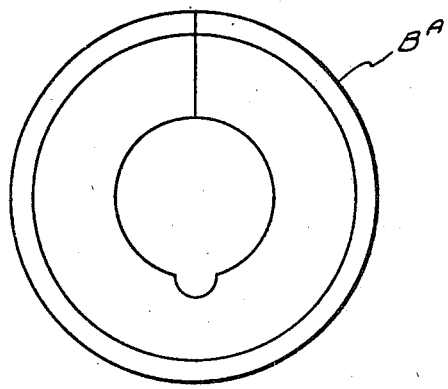
Fig. 2 is an elevation of one of the annular members forming an element of the construction in Fig. 1.
Figure 3:
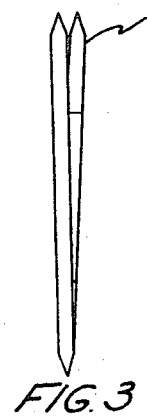
Fig. 3 is a side elevation of Fig. 2.
Figure 2A:
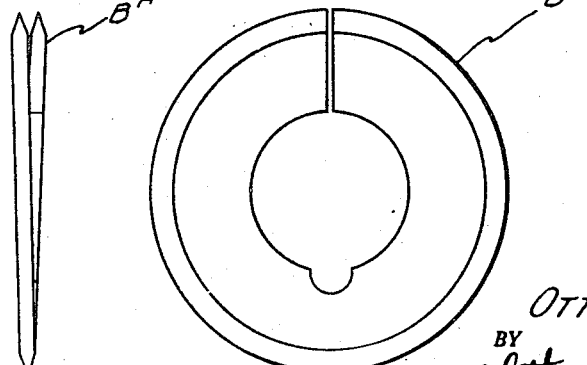
Fig. 2A is a similar view of a circular disc from which the member in Fig. 2 is formed.

Referring to the construction illustrated in Figs. 1, 2 and 3, A is an arbor of the forming tool. B, B', B² etc., are annular members formed from circular discs apertured to be sleeved on the arbor A. The discs from which these members are formed are each of a constant cross section so as to permit of machining on an ordinary lathe. However, the cross section is changed in successive discs, that for the member B having a V-shaped portion providing a sharp peripheral cutting edge. The succeeding discs change in cross section by progressively increasing the width thereof and diminishing the width of space between the same and the next adjacent disc. To form the members B, B', etc., from these respective discs, generally designated as B$^a$, each is radially slotted at one point and is then pressed in dies or otherwise refashioned into a helical form. The helix angle is such that the terminal end of one helical member aligns with the forward end of the next adjacent helical member so that the whole series forms a substantially continuous helical flange but of changing cross section in successive members. In mounting the series on the arbor A, clamping collars C and C' are arranged at opposite ends thereof. These collars have helical or helicoidal surfaces corresponding in general helix angle to the members B, B', etc. A nut D engaging a threaded portion D' on the arbor serves as the clamping means. Thus, the completed structure is provided with the helical forming flange.

With the construction shown in Figs. 4 to 11, I obtain the desired helical forming flange in a different manner. In this modification instead of using a complete convolution of the same cross section before changing to another cross section, I use a series of segments E, E', etc., each being of a different cross section and together forming a full convolution. In the manufacture of such segments each may be cut from a full disc, the remaining portion of which is adapted for the forming of other tools. Thus, the method of manufacture is essentially the same as that previously described so far as concerns the fashioning of the discs. However, the successive segments E, E', etc., are mounted on a common holder which imparts thereto a helical form. Preferably this holder comprises end collars having helicoidal faces similar to the collars C, C' and clamping bolts passing through these collars and segments as indicated at F, Fig. 4. The peripheral portions of successive sections are progressively increased in radius so as to engage and fashion the extruded fin. Thus, the complete forming of each fin may, if desired, be accomplished in a single convolution of the helix or, if desired, this may be distributed over a plurality of convolutions. The terminal end of each succeeding convolution registers with the forward end of the succeeding convolution in the same manner as described in the other modification. As specifically shown in Figs. 4 to 11, the tool is provided with three convolutions of fin forming flanges and the fin is completed in two revolutions of the tool. The successive steps in the operation are illustrated in Figs. 6 to 11. In Fig. 6 the segment E in convolution 1 has a V-shaped cross section with a sharp cutting edge; also, an adjacent segment E<sup>a</sup> in convolution 2 and a cooperating segment E<sup>b</sup> in convolution 3, together complete the extrusion of the fin during the second revolution. In the successive stages shown respectively in Figs. 7 to 11, the adjacent segments in the three convolutions are properly fashioned to produce progressively increasing radial dimension and decreasing width in the fin. In all of the operations the metal is upset axially, which produces the radial enlargement.

Figure 12:
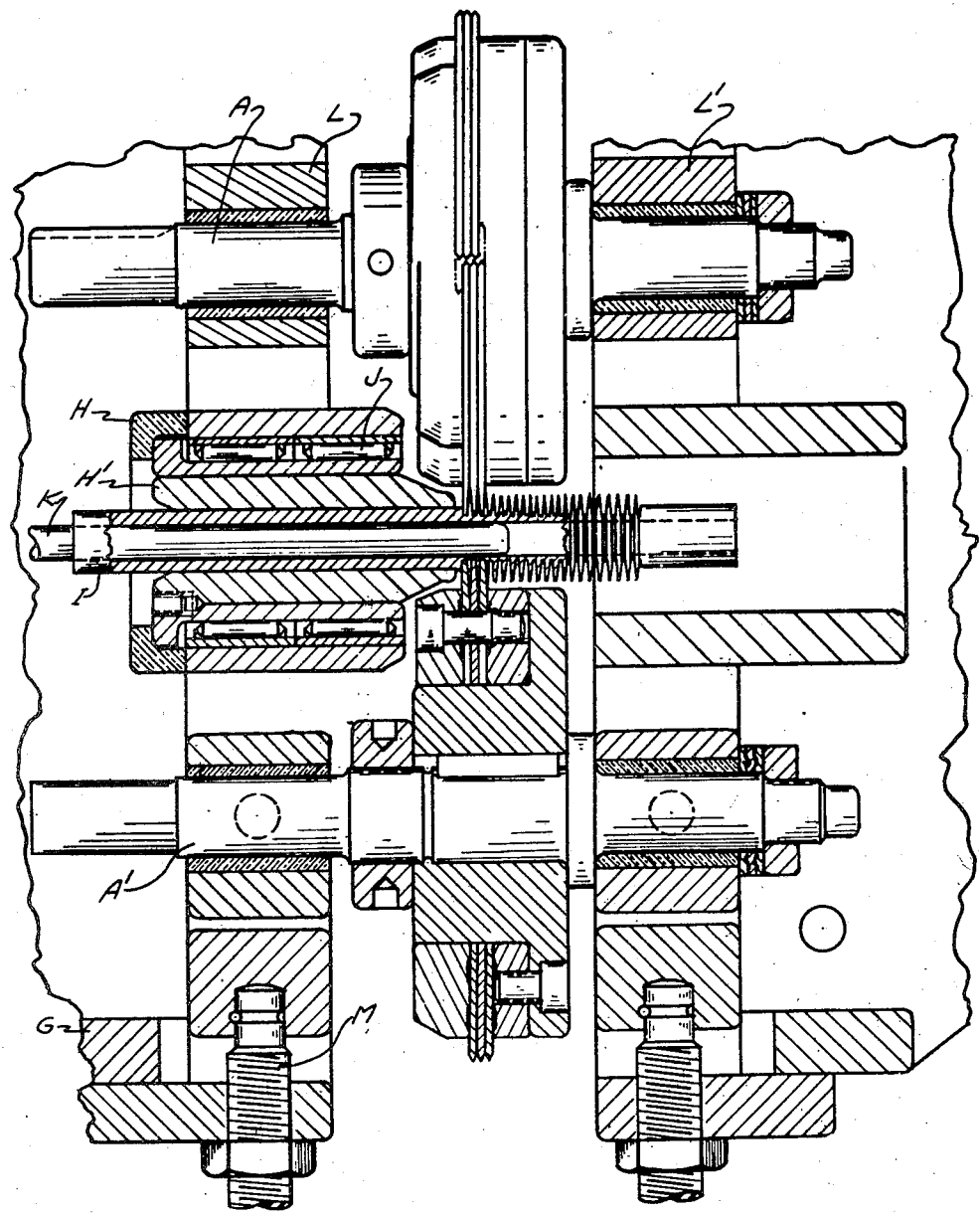
Fig. 12 is a central longitudinal section through the machine in the axial plane of the tube being finned.
Figure 13:
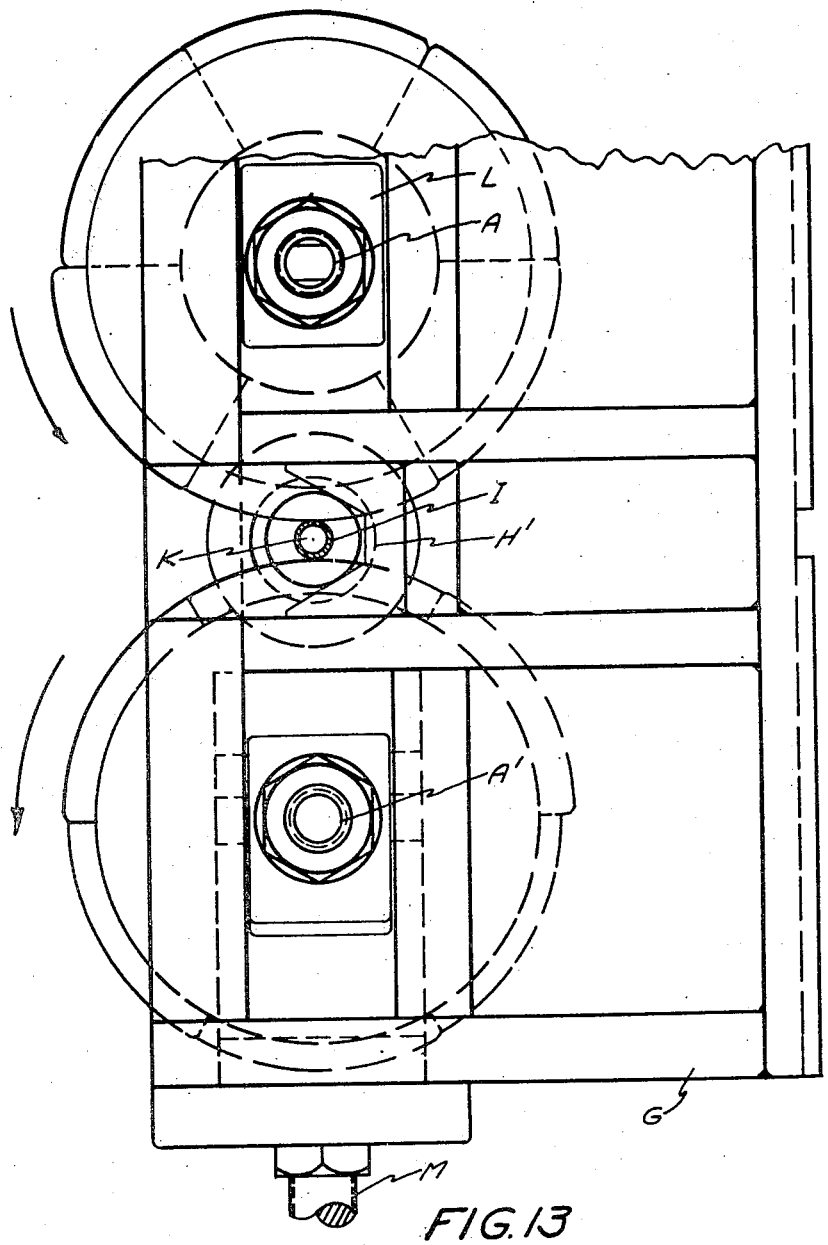
Fig. 13 is an end elevation.

The forming tools may be mounted in any suitable frame and adjustable therein into operative relation to the work. As shown in Figs. 12 and 13, the frame G has supported centrally therein a bearing H in which a work holder H' for the tube I is revolubly supported by roller bearings J. A mandrel K is placed within the tube I and projects beyond the end of the holder H'. The forming tools are mounted on arbors A journaled in spaced bearings L and L' also mounted in the frame G. As shown in Fig. 13, two of these forming tools are arranged on diametrically opposite sides of the axis of the tube I and the bearings for the arbor A' of the lower tool are adjustable by means of screws M towards or from the axis of the work. The tools operate on the portion of the tube which is beyond the holder H' but is supported by the projecting portion of the mandrel K, which latter receives the radial thrust of said tools and also holds the tube centralized. With this construction adjustment can be made for fitting tubes of different diameters by exchanging the holder H' and mandrel K and adjusting the tools relative to each other and the work by the screws M.

Instead of arranging the tools on diametrically opposite sides of the work, they may be arranged at three or more points around the periphery of the work as shown diagrammatically in Figs. 14, 15, 16 and 17. In Fig. 14 the forming tools N are of a diameter relative to that of the work so that they will clear each other when arranged in the same plane. In Fig. 15 the diameter of the forming tools O relative to the work is such that if arranged in the same plane they would interfere with each other but such interference may be avoided by arranging these tools in three different planes as shown in Fig. 15A. In Fig. 16, four forming tools are employed, two P, P' being arranged in one plane and the two others Q, Q' arranged in the second plane as shown in Fig. 16A. In Fig. 17 two forming tools R, R' are arranged in the same plane on diametrically opposite sides of the work and two guide rolls S, S' are diametrically opposite each other in a transverse plane of the work. It is obvious that various other arrangements of the tools may be made.

What I claim as my invention is:

1. In a machine for forming on tubing spaced integral annular fins, a roll comprising a plurality of radially split centrally apertured discs each of uniform radial cross section with successive discs of different cross sections, an arbor on which said discs are sleeved and clamping abutments for said discs on said arbor adapted to deflect the same into a helical form.

2. In a machine for forming on tubing spaced integral annular fins, a roll comprising a plurality of radially split centrally apertured discs each of uniform radial cross section with successive discs of different cross sections, an arbor on which said discs are sleeved and clamping abutments for said discs on said arbor adapted to deflect the same into a helical form, the portion in each disc on one side of the split being moved into alignment with the portion on the opposite side of the split of the next adjacent disc.

OTTO R. SCHULER.

REFERENCES CITED

The following references are of record in the file of this patent:

UNITED STATES PATENTS

| Number | Name | Date |
| --- | --- | --- |
| 1,865,575 | Locke | July 5, 1932 |
| 1,909,005 | Paugh | May 16, 1933 |
| 315,349 | Sheldon | Apr. 7, 1885 |